United States Patent [19]

Berger

[11] 4,233,550
[45] Nov. 11, 1980

[54] NUMERICALLY CONTROLLED MACHINE TOOLS PARTICULARLY STITCHING OR PRICKING MACHINES

[75] Inventor: Henri Berger, Triel sur Seine, France

[73] Assignee: Societe d'Applications Generales d'Electricite et de Mechanique (SAGEM), Paris, France

[21] Appl. No.: 928,019

[22] Filed: Jul. 26, 1978

[30] Foreign Application Priority Data

Jul. 29, 1977 [FR] France .................... 77 23477

[51] Int. Cl.³ .............................. G05B 19/10
[52] U.S. Cl. .................... 318/568; 318/577; 318/640
[58] Field of Search ............ 318/568, 577, 640, 661

[56] References Cited

U.S. PATENT DOCUMENTS

| | | | |
|---|---|---|---|
| 3,209,996 | 10/1965 | Carson et al. | 324/67 |
| 3,588,885 | 6/1971 | Schaal et al. | 340/347 |
| 3,742,200 | 6/1973 | Marle et al. | 235/154 |
| 3,936,712 | 2/1976 | Gerber et al. | 318/568 |
| 4,002,900 | 1/1977 | Kogut et al. | 318/577 X |
| 4,081,671 | 3/1978 | Bohme et al. | 318/577 X |
| 4,136,306 | 1/1979 | Westlund et al. | 318/568 |
| 4,144,827 | 3/1979 | Brown | 318/568 |
| 4,150,326 | 4/1979 | Engelberger et al. | 318/568 |

FOREIGN PATENT DOCUMENTS 2296046 7/1976 France .

Primary Examiner—B. Dobeck
Attorney, Agent, or Firm—Larson, Taylor and Hinds

[57] ABSTRACT

A numerically controlled stitching machine tool comprises a head and a table movable in relation to each other along two coordinate axes. The head is provided with a stitching needle and an optical follower placed in an invariable position in relation to the needle and receives the image of a drawing of the pattern when the drawing is placed on the table. The machine comprises, for each coordinate axis, a motor for moving the head and the table in relation to each other along that axis, transducer means for supplying an electrical signal whose amplitude depends on the movement along this axis, for A/D conversion and non-volatile storage, means for controlling the motor from the stored signals bringing into action said transducer and conversion means.

6 Claims, 3 Drawing Figures

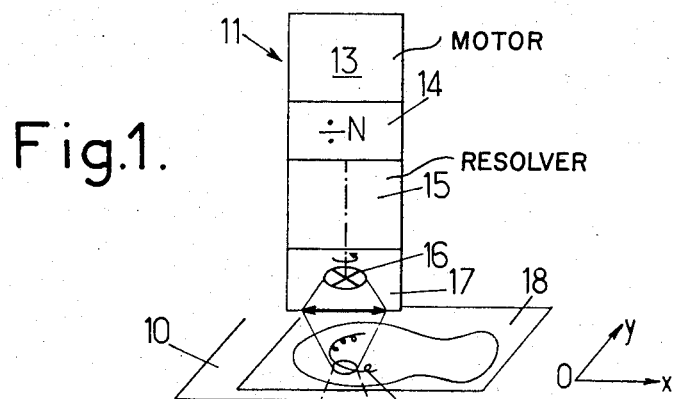
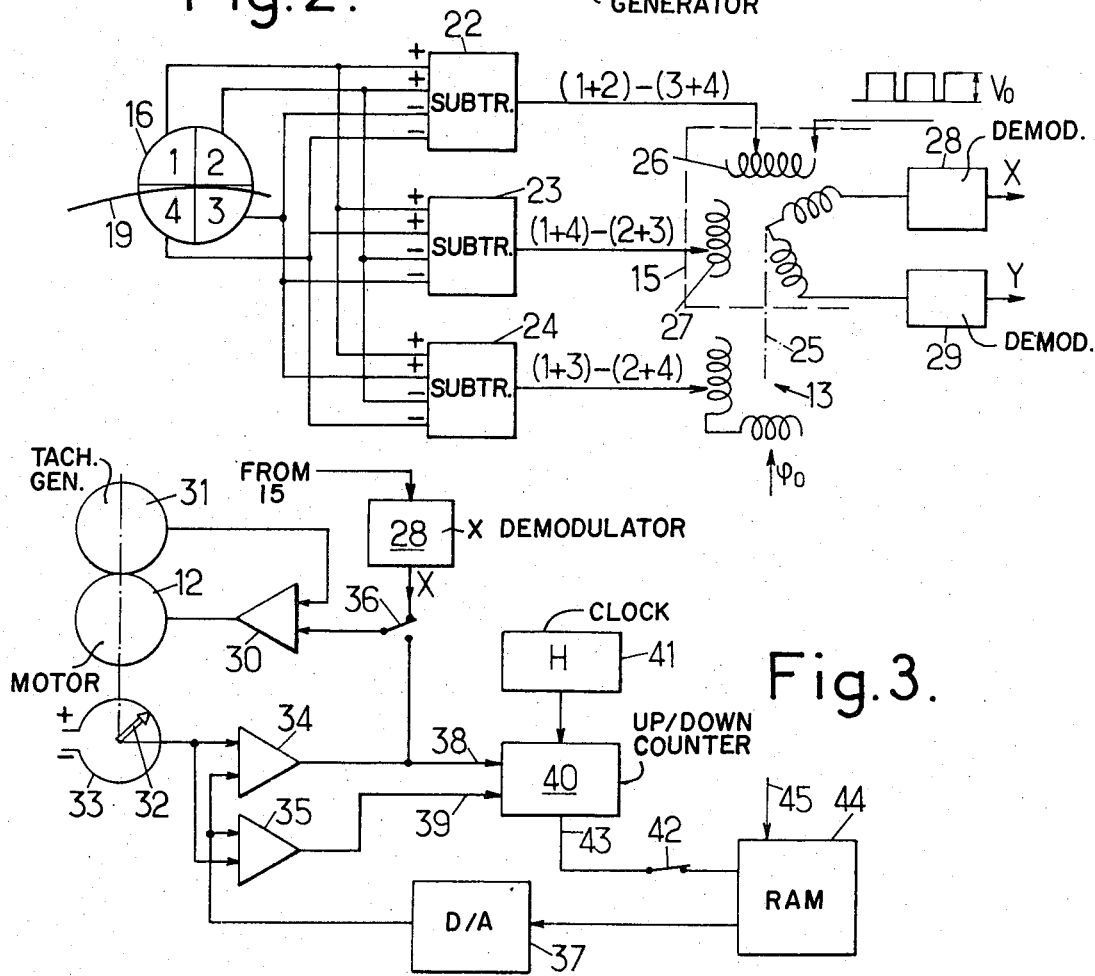

NUMERICALLY CONTROLLED MACHINE TOOLS PARTICULARLY STITCHING OR PRICKING MACHINES

BACKGROUND AND SUMMARY OF THE INVENTION

This invention relates to numerically controlled machine tools for effecting relative movement between a work piece carrying plate and a tool carried by a head, so that the tool can engage the work piece at predetermined intervals along a pattern stored in digital form in a memory.

The term "machine tool" must be interpreted in a wide sense. In fact, the invention is of particular utility when used for industrial sewing, pricking or stitching.

Pricking machines are used for decoration of material in sheet form, for instance for decorating the uppers of shoes by pricking holes along definite patterns, identical for all the shoes of a same series.

To automate this operation, pricking machines with digital control and a memory have already been constructed which prick holes in the shoes following a line which was first of all determined by a stylist, then given a material form on a drawing which is finally used for preparing the control program for the machine.

A prior art system of that type comprises an industrial sewing machine and a general purpose computer such as a PDP 8. The use of such a computer considerably increases the price of the equipment. The program is prepared by placing the drawing on a movable table above an optical viewfinder. An operator controls the movements of the table, typically through a micro joystick, so as to make the drawing pass under the viewfinder and he periodically memorizes points between which the computer will later interpolate for reconstituting the drawing. If the latter is complex, loading the information into the memory requires more than an hour for a shoe.

Another prior art machine uses a punched tape as a memory. The preparation of this tape from a template requires a computer which is not available to most users; the drawing should be sent to the machine manufacturer for preparation of the tape.

It is an object of the invention to provide a machine tool which does not require a computer for loading the data into the memory or for restitution; it is another object to provide a machine which allows a simple rapid and accurate storage of the pattern in digital form.

For that purpose, there is provided a machine tool for storing a digital record of a pattern and effecting a mechanical operation on work pieces according to the stored pattern, which comprises a work piece support table; a head carrying a tool for carrying out said mechanical operation; first and second drive means for effecting relative movement of said table and head along a first and a second coordinate axes, respectively; first and second transducer means for providing electrical signals representative of the amount of movement of said first and second drive means, respectively; an optical follower carried by said head in an invariable position with respect to said tool, said follower being constructed for receiving the image of said pattern as represented by a linear drawing and for controlling said first and second drive means for said follower to follow said pattern; digital memory means; analog-digital conversion means for conversion of analog electrical signals into or from digital signals storable in said memory means; and switch means having a first and a second condition, which in one condition route the signals from said transducer means to said conversion means and memory means for digital storage of the pattern followed by said optical follower and, in the other condition, cause control of the motor by the signals stored in digital from in the memory means through said transducer means and conversion means, whereby the linearity defects of said transducer means and conversion means are compensated.

It will be appreciated that the possible defects of linearity of the transducer means and the conversion means are automatically corrected, since all of them come into play for loading the memory for the restitution, on the sole condition that the work piece is placed on the table so that the linear pattern to be followed is in the same position as in the drawing. This constraint is in fact not troublesome at all, any position suitable for the work piece being also adapted for the drawing.

Once the loading operation is begun, it continues automatically, the optical follower travelling over the whole of the line traced on the drawing. Once the pattern has been memorized, it will be used for a great number of repeats.

The transducer means must have as high a resolution as possible. For this reason, plastic or ceramic track potentiometers will in general be used rather than wound potentiometers. On the other hand, a high level of linearity of the A/D conversion means is not required. The number of quantization levels and binary digits representing the amount of movement will be selected depending on the accuracy desired.

The invention will be better understood from the following description of a preferred embodiment thereof.

SHORT DESCRIPTION OF THE DRAWING

FIG. 1 is a simplified drawing showing the main optical and mechanical components of the sensor carried by the head of a machine;

FIG. 2 is a simplified block diagram of the electrical circuit of the sensor;

FIG. 3 is a simplified block diagram of the electronic circuitry associated with one of the axes x or y of the machine.

DETAILED DESCRIPTION OF A PREFERRED EMBODIMENT

Referring to FIG. 1, a table 10 of a pricking machine is arranged to receive either a drawing indicating a pattern to be stored and later reproduced and a work piece. The table is movable in relation to a working head (not shown) along two orthogonal coordinate axes ox and oy by motors, such as motor 12 in FIG. 3, which will be assumed to be the control motor along direction ox. The head carries an optical follower 11 and a needle actuating mechanism (not shown) which is adapted to reciprocate the needle in a direction perpendicular to plane oxy while maintaining the needle in an invariable position with respect to the optical follower along directions ox and oy. The general arrangement of the head and table, as well as the mechanical linkages are quite conventional and need not be described here.

Referring again to FIG. 1, the optical follower 11 comprises an electrical motor-generator 13 which drives, through a 1/N ratio reducing gear 14, a resolver 15. The output shaft of this resolver carrier a four quadrant optical detector 16. Detector is typically a four quadrant photoelectric cell and is associated with an optical unit 17 which forms thereon the image of a fraction of a pattern represented by a line 19 traced on a drawing 18 placed on table 10. A record is to be produced from the drawing for memorizing the pattern. The zone "seen" by detector 16 is illuminated by a source, formed for example by a light emitting diode 20 provided with an optical concentration unit indicated schematically at 21. The diode is energized by a generator 22a, advantageously modulated at a frequency distinct from that of the environmental lighting.

The four quadrant photoelectric detector 16 is associated with an electrical circuit which allows it to follow line 19. Different circuits may be used. Referring to FIG. 2, there is schematically shown a circuit designed so that the centre of the four quadrant detector 16 follows line 19, motor 13 angularly locating detector 16 so that the line separating sectors 1 and 2 from sectors 3 and 4 remains substantially tangential to the line.

To accomplish this the output signals of the four sectors 1, 2, 3 and 4 are applied to amplification and subtraction circuits which have been illustrated as blocks 22, 23 and 24.

Block 24, which forms the difference between the analog signals supplied by the two pairs of diagonal quadrants, drives one of the windings of motor 13 (a two phase motor of conventional type).

Shaft 25 of motor 13 drives the rotary windings of resolver 15 through reduction gear 14. One of the fixed windings 26 of the resolver receives, from block 22, an analog electric signal representative of the difference between the sum of the signals from quadrants 1 and 2 and the sum of the signals from quadrants 3 and 4. Winding 27, disposed at 90° to winding 26, receives, from block 23, a signal representative of the difference between the sum of the signals from quadrants 1 and 4 and the sum of the signals from quadrants 2 and 3. The output of one of the windings of the rotatable part of one of the resolvers 15 is connected to a demodulator 28 corresponding to axis ox. The other winding cooperates with an identical demodulator 29 corresponding to axis oy.

A generator (not shown) may be actuated to deliver feeding movement pulses or advance pulses at constant frequency to winding 26. The amplitude of the feeding pulses determines the speed of advance of the optical follower along line 19. Their duration determines the amount of movement corresponding to each pulse. The successive positions of the point along the linear pattern reached by the follower are stored during the time intervals between successive pulses.

Demodulators 28 and 29 are each associated with a separate electronic circuitry which may be as shown in FIG. 3. All the elements of that circuitry whose defects of linearity would likely affect the fidelity of reproduction if they were only used during one of these operations are included in a part of the overall circuitry which is used both during storage and during restitution.

The output signal of demodulator 28 is applied to one of the inputs of a power amplifier 30 which drives motor 12 for movement along axis ox. The shaft of motor 12 drives a tachymetric generator 31, whose output is applied to another input of differential amplifier 30, and the slider 32 of a ceramic or plastic track potentiometer 33. For storage, an operator operable inverter switch 36 is put in a condition in which it connects the output of demodulator 28 to the input of amplifier 30; for restitution, switch 36 is reversed, separates the input of amplifier 30 from demodulator 28 and connects amplifier 30 to another branch, as will be seen later.

The analog signal picked up by slider 32 of potentiometer 33 is applied to one of the inputs of two comparators 34 and 35. The other input of each comparator is connected to a D/A converter 37. The comparators 34 and 35 are respectively arranged to supply a positive signal at their output when the amplitude of the signal from slider 32 is greater than and less than that of the signal coming from D/A converter 37.

The outputs of comparators 34 and 35 are connected respectively to the count-up control input 38 and count-down control input 39 of an up-down counter 40. A clock 41 is connected to the counter so as to increase or decrease its contents according to whether the output 38 or output 39 is energized by a positive signal. The contents of the counter, which appears as a binary number at output 43 (shown for simplification in the form of a simple line) may be transmitted through a switch 42 to a programmable memory 44. Memory 44 is provided with an input 45 which receives signals synchronized with the feeding movement signals applied to winding 26, so that memorization takes place after each feeding movement pulse. Finally, memory 44 is connected to the digital port of D/A converter 37.

Operation of the machine during the loading of the data into the memory as during restitution is clear from the preceding description and will only be shortly indicated.

When a pattern represented by a line should be stored for later reproduction, a tracing bearing the pattern in the form of an opaque line is placed on table 10 and the follower is brought, by a manual control not shown, into a position such that the image of the line is formed on detector 16 as shown in FIG. 2. Switches 36 and 42, which are coupled for simultaneous actuation, are placed in the position shown in FIG. 3. The circuit is energized from an electrical power source (not shown) whereby clock pulses are directed to the up-down counter 40 during the time intervals between the feeding movement pulses.

In each circuit branch, the contents of the appropriate counter is increased or decreased depending upon the condition of the associated comparators 34 and 35. Then, the contents of the counter is transferred into the read and write memory 44 and the corresponding number is decoded at 37 until the output of comparators 34 and 35 has become zero, i.e. until the voltage delivered by 32 is equal to the voltage from 37.

The successive points, whose spacing is determined by the amplitude and the time duration of pulses applied at 26, are stored in the read and write memory 44 in the form of n couples of coordinates x, y corresponding to n feeding pulses.

For reproduction of the pattern, the needle actuating mechanism is energized, switch 42 is opened, inverter 42 is reversed with respect to the condition shown in FIG. 3. The n couples of coordinates are successively read out from the read out and write memory, decoded at 37, compared by comparators 34 and 35 with the voltage picked up by slider 32. Advance to the next couple of coordinate values is caused by a triggering circuit (not shown) responsive to zero crossing of the output of comparators 34 and 35 due to rotation of motor 12 in one direction or the other.

A delay in actuation of the motor of one branch (associated with ox for instance) with respect to the motor of the other branch has no detrimental effect since pricking only takes place once the point whose coordinates have been supplied by the memory has arrived in front of the head needle.

Numerous modified embodiments will appear to those skilled in the art; for example, a magnetic curve follower may be used instead of an optical follower.

I claim:

1. In a numerically controlled machine tool for storing a digital record of a pattern and effecting a mechanical operation on work pieces according to the stored pattern, the combination of:
    a work piece support table,
    a head carrying a tool for carrying out said mechanical operation,
    first and second drive means for effecting relative movement of said table and head along a first and a second coordinate axes, respectively,
    first and second transducer means for providing electrical signals representative of the amount of movement of said first and second drive means, respectively,
    an optical follower carried by said head in an invariable position with respect to said tool, said follower being constructed for receiving the image of said pattern as represented by a linear drawing and for automatically controlling said first and second drive means for said follower to follow said pattern,
    digital memory means,
    analog digital conversion means for conversion of analog electrical signals into or from digital signals storable in said memory means,
    and switch means having a first and a second condition, which, in one condition, route the signals from said transducer means to said conversion means and memory means for digital storage of the pattern followed by said optical follower and, in the other condition, cause control of the drive means by the signals stored in digital form in the memory means through said transducer means and conversion means, whereby the linearity defects of said transducer means and conversion means are compensated.

2. A machine tool according to claim 1, wherein the transducer means are of high resolution.

3. A machine tool according to claim 2, wherein the transducer means are plastic or ceramic track potentiometers.

4. A machine tool according to claim 1 or 2, wherein the optical follower comprises a rotary four quadrant photoelectric detector, a resolver whose rotary part is connected for rotation with said detector, a motor drivably connected to said rotary part and detector, said motor being controlled by a signal proportional to the difference between the amounts of light received by two opposed couples of quadrants, signals representative of the differences of amounts of light of the two halves of the cell in relation to the coordinate axes being applied to the two windings of the fixed part of the resolver and one of said winding being connected to further receive feeding movement pulses of constant frequency.

5. A machine tool according to claim 1, wherein the tool is a pricking needle.

6. A process for carrying out, on a work piece, a mechanical operation along a linear pattern reproducing a linear drawing, comprising the steps of: automatically moving a table carrying the drawing and a head provided with an optical follower in relation to each other so that the follower travels along the linear drawing; simultaneously causing, for each of two coordinate axes, a respective motor to move the head and the table in relation to each other; creating electrical signals having an amplitude depending on the amount of movement along each axis through transducer means; converting said electrical signals into digital signals; storing the digital signals in a memory; replacing the drawing with the work piece on the table; and controlling the motors from the stored digital signals converted in analog form and transmitted to the motors through the same means as those previously serving for the storage and through said same means alone to reproduce said pattern at the same location on the table where said drawing was previously located.

* * * * *